US008796370B2

(12) United States Patent
Momose et al.

(10) Patent No.: US 8,796,370 B2
(45) Date of Patent: Aug. 5, 2014

(54) COATING COMPOSITION

(75) Inventors: Hiromichi Momose, Settsu (JP);
Hiroshi Torii, Settsu (JP); Seitaro Yamaguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 92 days.

(21) Appl. No.: 12/670,610

(22) PCT Filed: Aug. 5, 2008

(86) PCT No.: PCT/JP2008/064039
§ 371 (c)(1),
(2), (4) Date: Jan. 25, 2010

(87) PCT Pub. No.: WO2009/022579
PCT Pub. Date: Feb. 19, 2009

(65) Prior Publication Data
US 2010/0197849 A1 Aug. 5, 2010

(30) Foreign Application Priority Data

Aug. 10, 2007 (JP) .................. 2007-210199
Mar. 27, 2008 (JP) .................. 2008-084357

(51) Int. Cl.
*C08K 5/06* (2006.01)
*C08K 5/10* (2006.01)
*C08L 27/00* (2006.01)
*B32B 27/18* (2006.01)
*B32B 27/28* (2006.01)

(52) U.S. Cl.
USPC ............ 524/339; 524/520; 528/480; 428/421

(58) Field of Classification Search
USPC .................. 524/520, 339; 528/480; 428/421
See application file for complete search history.

(56) References Cited

U.S. PATENT DOCUMENTS

| 4,668,639 | A | * | 5/1987 | Johannsson ............ 436/518 |
| 4,696,822 | A | * | 9/1987 | Matsumura et al. ....... 424/490 |
| 5,510,169 | A | * | 4/1996 | Greczyna et al. ......... 428/147 |
| 5,817,419 | A | | 10/1998 | Fryd et al. |
| 6,335,000 | B1 | * | 1/2002 | Pratley ................. 424/47 |
| 6,423,324 | B1 | * | 7/2002 | Murphy et al. .......... 424/401 |
| 6,833,403 | B1 | | 12/2004 | Blädel et al. |
| 7,067,574 | B2 | * | 6/2006 | Tomihashi et al. ........ 524/376 |
| 2004/0192829 | A1 | | 9/2004 | Soda et al. |
| 2004/0242753 | A1 | | 12/2004 | Tomihashi et al. |
| 2006/0041051 | A1 | | 2/2006 | Nakatani et al. |
| 2007/0238800 | A1 | * | 10/2007 | Neal et al. ............. 521/174 |
| 2008/0214714 | A1 | * | 9/2008 | Hoshikawa et al. ...... 524/319 |
| 2009/0069493 | A1 | | 3/2009 | Tsuda et al. |

FOREIGN PATENT DOCUMENTS

| CN | 1196076 A | 10/1998 |
| JP | 52013531 A | 2/1977 |
| JP | 11-513052 A | 11/1999 |
| JP | 11513052 A | 11/1999 |
| JP | 2002-532583 A | 10/2002 |
| JP | 2003-041126 A | 2/2003 |
| JP | 2003041126 A | 2/2003 |
| JP | 2005-15515 A | 1/2005 |
| JP | 2005-336241 A | 12/2005 |
| JP | 2006188704 A | 7/2006 |
| JP | 2007-177188 A | 7/2007 |
| JP | 2007177188 A | 7/2007 |
| JP | 2007-191709 A | 8/2007 |
| JP | 2007191709 A | 8/2007 |
| WO | 9703140 A1 | 1/1997 |
| WO | 9740112 A1 | 10/1997 |
| WO | 9921927 A1 | 5/1999 |
| WO | 03/011991 A1 | 2/2003 |
| WO | 2004/050719 A1 | 6/2004 |
| WO | 2006/035726 A1 | 4/2006 |
| WO | 2006035726 A1 | 4/2006 |
| WO | 2006/078014 A1 | 7/2006 |
| WO | 2006078014 A1 | 7/2006 |
| WO | 2006/109854 A1 | 10/2006 |
| WO | 2006109854 A1 | 10/2006 |
| WO | 2006/137538 A1 | 12/2006 |
| WO | 2006137538 A1 | 12/2006 |

OTHER PUBLICATIONS

Orica Chemical, Material Safety Data Sheet for Surfynol 440 Surfactant, 5 pages, Version 2, Aug. 4, 2008.*
Air Products, a brochure for Surfynol Surfactants, 8 pages, 1999.*
Material Safety Data Sheet for Tergitol 15-S-3 Surfactant by the Dow Chemical Company, 14 pages, Feb. 6, 2003.*
Surfynol Surfactants: Superior Substrate Wetting Agents in Water-Based Prining Inks by Air Products and Chemicals, Inc., 8 pages, 1999.*
Surfactants Classified by HLB numbers by Sigma-Aldrich Co., 5 pages, Downloaded in Dec. 2013.*
Emulsifiers with HLB Values, 3 pages, Downloaded in Dec. 2013.*

\* cited by examiner

*Primary Examiner* — Tae H Yoon
(74) *Attorney, Agent, or Firm* — Sughrue Mion, PLLC

(57) ABSTRACT

A coating composition which is an aqueous dispersion of a fluororesin particle (A) including a fluororesin, a resin particle (B) the decomposition and vaporization of which begin at a temperature not higher than a decomposition temperature of the fluororesin, and a nonionic surfactant (C) in an aqueous medium. The aqueous dispersion contains the resin particle (B) in an amount of 5 to 25 parts by mass based on 100 parts by mass of the fluororesin particle (A) and a fluorine-containing surfactant in an amount smaller than 500 ppm relative to the fluororesin particle (A).

10 Claims, No Drawings

COATING COMPOSITION

TECHNICAL FIELD

The present invention relates to a coating composition.

BACKGROUND ART

A fluororesin such as polytetrafluoroethylene [PTFE] is excellent in heat resistance, chemical resistance, water and oil repellency, mold releasability and sliding property, among others. Therefore, a fluororesin is used as a coating agent in the field of mold release agents, rolls in office automation [OA] equipments, irons and other household utensils, frying pans, hot plates and other kitchen utensils, food industry, electric industry, machine industry and so forth.

On the other hand, a fluororesin has a problem in that, due to its nonstickiness, they are poor in adhesion to an article to be coated. For improving this adhesion, it has become a common practice to coat an article with a coating composition containing a binder resin such as a heat-resistant resin in combination with a fluororesin.

The following compositions, for example, have been proposed as a coating composition comprising a fluororesin and a heat-resistant resin: a coating composition comprising a fluororesin, mica or metal flake, a depolymerizable acrylic resin and a liquid carrier (cf. Patent Document 1) and a coating composition comprising a fluororesin and a specific polyether urethane resin (cf. Patent Document 2 and Patent Document 3).

The following compositions have also been proposed as such a coating composition improved in coating performance: a coating composition comprising a melt-processable fluororesin showing a melt viscosity in a specific range and an acrylic copolymer showing a decomposition temperature not exceeding 40° C. (cf. Patent Document 4) and a coating composition comprising a fluororesin particle, a high-boiling polyhydric alcohol, a depolymerizable acrylic resin and a nonionic surfactant and an aqueous medium (cf. Patent Document 5).

Generally, these coating compositions can be prepared by adding a resin-containing aqueous dispersion or the like to a fluororesin-containing aqueous dispersion. The fluororesin-containing aqueous dispersion is the one obtained by carrying out polymerization in the presence of an aqueous medium containing a fluorine-containing surfactant; however, the fluorine-containing surfactant is expensive and, therefore, it is preferable that the content thereof in the fluororesin-containing aqueous dispersion be reduced for the purpose of recovering the same, for example.

Methods known for reducing the fluorine-containing surfactant level in a fluororesin-containing aqueous dispersion comprise, for example, concentration by phase separation, electrical concentration and/or ion exchange concentration (cf. e.g. Patent Document 6, Patent Document 7 and Patent Document 8). However, a fluororesin-containing aqueous dispersion having a low fluorine-containing surfactant concentration has such problems as failure to stably dispersing a fluororesin and poor coating performance of a coating composition in which a fluororesin is used.

Patent Document 1: Japanese Kokai (Laid-open) Publication S52-13531
Patent Document 2: International Publication WO 97/40112
Patent Document 3: International Publication WO 99/21927
Patent Document 4: Japanese Kohyo (Laid-open under PCT) Publication H11-513052
Patent Document 5: International Publication WO 2003/011991
Patent Document 6: International Publication WO 2004/050719
Patent Document 7: Japanese Kohyo Publication 2002-532583
Patent Document 8: Japanese Kokai Publication 2006-188704

DISCLOSURE OF INVENTION

Problems Which the Invention is to Solve

In view of the foregoing, it is an object of the present invention to provide a coating composition which maintains good mechanical stability and storage stability as well as excellent coating performance even at reduced fluorine-containing surfactant content levels.

Means for Solving the Problems

The present invention is a coating composition which is an aqueous dispersion comprising a fluororesin particle (A) comprising a fluororesin, a resin particle (B) the decomposition and vaporization of which begin at a temperature not higher than a decomposition temperature of the fluororesin and a nonionic surfactant (C) in an aqueous medium, wherein the aqueous dispersion contains the resin particle (B) in an amount of 5% to 25% by mass relative to the fluororesin particle (A) and a fluorine-containing surfactant in an amount smaller than 500 ppm relative to the fluororesin particle (A).

The present invention is a method of producing the above coating composition, which comprises the step of admixing an aqueous dispersion comprising fluororesin particle (A) comprising a fluororesin, a nonionic surfactant (C1) having an HLB value exceeding 10.0 but not exceeding 16.0 and a fluorine-containing surfactant and having a fluorine-containing surfactant content lower than 500 ppm relative to the fluororesin particle (A), with a nonionic surfactant (C2) having an HLB value of not lower than 5.0 but not higher than 10.0 and a resin particle (B) the decomposition and vaporization of which begin at a temperature not higher than the decomposition temperature of the fluororesin.

The present invention is a coated article which is obtained by applying a coating composition according to the above coating composition.

In the following, the invention is described in detail.

A coating composition according to the present invention, when applied to an article to be coated, can form a coating film on that article. The term "coating" as used herein referring to the above-mentioned coating composition means a step of applying the coating composition, if necessary followed by drying, and then baking the coating film.

The coating composition according to the invention is characterized in that it contains a nonionic surfactant (C) and is thereby improved in mechanical stability and storage stability and in coating performance. Therefore, in spite of a very low fluorine-containing surfactant content level therein, the present coating composition shows high mechanical stability and storage stability and can give a coating film free of such a coat film defect as a crack and a hard spot. Thus, the present invention is based on the finding that a fluorine-containing surfactant content can be reduced by causing the composition in question to contain a nonionic surfactant (C).

The above-mentioned coating composition contains the fluororesin particle (A) and therefore can provide excellent heat resistance and chemical resistance.

The resin particle (B) mentioned above has an effect of inhibiting cracking (so-called mud cracking) caused by coating film shrinkage upon evaporation of a film-forming auxiliary solvent and/or water on the occasion of drying a coated article and is gradually decomposed in the step of baking; presumably, this is the reason why the coating composition according to the invention hardly causes mud cracking on the occasion of coating. Therefore, the above-mentioned coating composition is considered to be able to give a coating film free of such a coat film defect as a crack, a pinhole and a hard spot owing to such effect of the resin particles (B) as mentioned above and the above-mentioned effect of the nonionic surfactant (C).

The coating composition according to the invention is an aqueous dispersion containing, in an aqueous medium, the fluororesin particle (A) comprising a fluororesin, the resin particle (B) capable of being decomposed and evaporated at a temperature not higher than a decomposition temperature of the above-mentioned fluororesin, and the nonionic surfactant (C).

The fluororesin particle (A) in the coating composition according to the invention is a particle made of a fluororesin and is dispersed in an aqueous medium.

The fluororesin mentioned above is not particularly restricted but may be any of fluorine atom-containing resins such as, for example, polytetrafluoroethylene [PTFE], ethylene/TFE copolymers [ETFE], tetrafluoroethylene (TFE)/hexafluoropropylene [HFP] copolymers [FEP], TFE/perfluoro(alkyl vinyl ether) [PAVE] copolymers [PFA], poly(vinylidene fluoride) [PVDF], vinylidene fluoride [VDF] copolymers, and poly(vinyl fluoride) [PVF].

As the above-mentioned PFA, there may be mentioned TFE/perfluoro(methyl vinyl ether) [PMVE] copolymers, TFE/perfluoro(ethyl vinyl ether) [PEVE] copolymers and TFE/perfluoro(propyl vinyl ether) [PPVE] copolymers, among others. As the above-mentioned VDF copolymer, there may be mentioned VDF/TFE copolymers, VDF/HFP copolymers, VDF/CTFE copolymers, VDF/TFE/HFP copolymers and VDF/TFE/CTFE copolymers, among others.

The fluororesin mentioned above may occur as a particle obtained by copolymerization, by the seed polymerization technique, of one monomer species or two different monomer species, or as a particle having a core-shell structure.

The above-mentioned fluororesin preferably comprises at least one resin selected from the group consisting of PTFE, FEP and PFA.

In the practice of the present invention, the PTFE mentioned above may be a TFE homopolymer or modified polytetrafluoroethylene [modified PTFE] provided that it is non-melt-processable. The term "non-melt-processable" as used herein means that melt flow rates at a temperature higher than a crystalline melting point cannot be determined by the methods according to ASTM D 1238 and ASTM D 2116.

The modified PTFE mentioned above is a copolymer of TFE and a very small proportion of a monomer copolymerizable with TFE, which copolymer cannot be melt-molded. As the monomer to be used in a very small proportion, there may be mentioned, for example, fluoroolefins, fluoro(alkyl vinyl ethers), cyclic fluoromonomers and perfluoroalkylethylenes.

As the above-mentioned fluoroolefin, there may be mentioned, for example, HFP, CTFE and like perfluoroolefins.

As the above-mentioned fluoro(alkyl vinyl ether), there may be mentioned, for example, PAVE. As the PAVE, there may be mentioned those enumerated hereinabove.

A very small proportion monomer unit derived from the monomer used in a very small proportion preferably amounts to 0.001% to 2% by mass, more preferably to 0.01% to 1% by mass, of the whole polymer chain of the modified PTFE.

The term "monomer unit", such as the above-mentioned "very small proportion monomer unit", means a segment which constitutes a part of the molecular structure of the fluororesin and is derived from the corresponding monomer. The content of the above-mentioned very small proportion monomer unit derived from the monomer used in a very small proportion is the value obtained by subjecting a fine powder prepared by coagulation of an aqueous PTFE dispersion, followed by washing and drying, to infrared absorption spectrometry.

The FEP mentioned above preferably has a HFP unit content exceeding 2% by mass but not exceeding 20% by mass, more preferably within the range of 10% to 15% by mass.

The PAVE in the PFA mentioned above preferably has an alkyl group containing 1 to 6 carbon atoms; PMVE, PEVE or PPVE is more preferred.

The PFA mentioned above preferably has a PAVE unit content exceeding 2% by mass but not exceeding 5% by mass, more preferably within the range of 2.5% to 4.0% by mass.

The above-mentioned FEP and PFA may be ones resulting from polymerization of a further monomer provided that they essentially have the respective compositions specified hereinabove. As the further monomer, there may be mentioned, for example, PAVE for the FEP, and HFP for the PFA. The further monomer may comprise one or two or more species.

Generally, the content of such a further monomer or further monomers mentioned above is preferably not higher than 1% by mass relative to the mass of the fluororesin, although it may vary depending on the species of the monomer. A more preferred upper limit thereto is 0.5% by mass, and a still more preferred upper limit thereto is 0.3% by mass.

The coating composition according to the invention may contain two or more kinds of fluororesin particles (A). For example, the composition may contain, as resins constituting the fluororesin particles (A), PTFE and PFA, PTFE and FEP, and a combination of PTFE, PFA and FEP.

The above-mentioned fluororesin particle (A) is more preferably made of a TFE homopolymer and/or modified PTFE. The term "TFE homopolymer and/or modified PTFE" includes, within the meaning thereof, a TFE homopolymer, modified PTFE, and a mixture of a TFE homopolymer and a modified PTFE.

The fluororesin particle (A) mentioned above preferably has an average particle diameter of 0.01 to 5 µm. When the average particle diameter is smaller than 0.01 µm, a particle comprising the fluororesin is poor in mechanical stability and the coating composition obtained by using the same may possibly be inferior in mechanical stability and storage stability. When it is in excess of 5 µm, a particle comprising the fluororesin particle (A) is lacking in a homogeneous dispersibility and the coating composition obtained by using the same, when used in coating, fails to give a coating film having a smooth surface and physical properties of the coating film are inferior in some cases. A more preferred upper limit thereto is 0.5 µm, and a more preferred lower limit thereto is 0.05 µm.

The above-mentioned average particle diameter of the fluororesin particles (A) is a value measured by observation under a transmission electron microscope.

The term "mechanical stability" as used herein refers to the property hardly causing the formation of a non-redispersible aggregate even upon exposure to vigorous stirring or shearing force caused by a homogenizer or the like on the occasion of transportation and redispersion.

The above-mentioned resin particle (B) is made of a resin having a characteristic such that a temperature at which the decomposition and vaporization thereof start (hereinafter referred to also as "vaporization temperature") is not higher than a decomposition temperature of the above-mentioned fluororesin.

The vaporization temperature mentioned above may be at any level within the range mentioned above; generally, however, it is preferably not higher than 350° C., more preferably not higher than 330° C.

The above vaporization temperature is preferably not lower than 200° C. so that the coating film obtained may be free of any coat film defects. When the vaporization temperature mentioned above is not lower than 200° C., the resin particles (B) remain at a temperature at which the fluororesin starts melting, so that the coat film defect is hardly caused.

It is preferred that 10% to 50% of the resin constituting the resin particle (B) remain at a temperature at which the fluororesin starts melting (generally 240° C. to 345° C.) and that only a proportion not exceeding 5%, more preferably zero percent, thereof remain at the fluororesin baking temperature (generally 360 to 420° C.)

The "temperature at which the decomposition and vaporization start" so referred to herein is a value of 10mg of a sample measured by using a model RTG220 thermogravimetric analyzer (product of SII Nano Technology Inc.) in an air atmosphere (air flow rate 200 ml/minute) at a programming rate of 10° C./minute. The "decomposition temperature of the fluororesin" so referred to herein means a temperature at which the weight loss of the resin arrives at a level of 10% or higher upon thermal weight loss measurement under the same conditions as mentioned above.

The resin mentioned above is not particularly restricted provided that the vaporization temperature thereof is within the range mentioned above; for example, depolymerizable acrylic resins and urethane resins may be mentioned. Among them, the depolymerizable acrylic resin is preferred.

Preferred as the above-mentioned depolymerizable acrylic resin is, for example, a methacrylate homopolymer or methacrylate copolymer obtained by polymerization of at least one methacrylate monomer represented by the formula (I):

$$CH_2=C(CH_3)-COOR^a \quad (I)$$

wherein $R^a$ represents an alkyl group containing 1 to 5 carbon atoms or a hydroxyalkyl group containing 1 to 5 carbon atoms.

As the above-mentioned methacrylate monomer, there may be mentioned methyl methacrylate, ethyl methacrylate, propyl methacrylate, dimethylpropyl methacrylate, butyl methacrylate and pentyl methacrylate. Among them, butyl methacrylate is preferred.

Preferred as the methacrylate copolymer mentioned above is ones resulting from copolymerization of a monomer containing such a functional group as carboxyl or hydroxyl so that a state of dispersion of the resin particle (B) may be stabilized.

The above-mentioned resin particle (B) generally has an average particle diameter of 0.01 to 10 μm, preferably 0.1 to 1 μm. When the average particle diameter is smaller than 0.01 μm, a crack may possibly be caused and, when it is in excess of 10 μm, a process of coating may become difficult.

The average particle diameter of the resin particle (B) so referred to herein is measured by observation under a transmission electron microscope.

In the coating composition according to the invention, the resin particles (B) amount to 5% to 25% by mass relative to the fluororesin particles (A) mentioned above. When the proportion of the resin particles (B) is smaller than 5% by mass relative to the fluororesin particles (A), it becomes difficult for a fluororesin to form a coating film and, when the proportion is in excess of 25% by mass, a discolored coating film may be obtained in some cases.

A preferred lower limit to the proportion of the resin particles (B) is 7% by mass relative to the fluororesin particles (A), and a more preferred lower limit thereto is 10% by mass, while a preferred upper limit thereto is 20% by mass and a more preferred upper limit thereto is 15%.

In the coating composition according to the invention, the nonionic surfactant (C) mentioned above preferably has an HLB value of not lower than 5 but not higher than 10.0.

When the HLB value of the nonionic surfactant (C) is in excess of 10.0, the dispersibility of the fluororesin particle (A) may be deteriorated and the coating composition obtained becomes unsatisfactory in mechanical stability, possibly causing hard spots (minute lumps of the coating) on the occasion of application.

When, on the other hand, the HLB value thereof is smaller than 5.0, the nonionic surfactant is insoluble in water and therefore may fail to blend into the coating composition.

In cases where the coating composition contains two or more nonionic surfactants, at least one of the nonionic surfactant should preferably have an HLB value of 5.0 to 10.0 while the other or remaining nonionic surfactants may have an HLB value exceeding 10.0.

The HLB value is more preferably not greater than 9.5. When it is within the range mentioned above, the HLB value is more preferably not smaller than 6.0 so that the dispersibility of a coating composition obtained may not be deteriorated. A more preferred lower limit to the above HLB value is 7.0, and a particularly preferred lower limit thereto is 9.0.

The "HLB value" so referred to herein is calculated according to Griffin's method of calculation. The HLB value is a value characteristic of the molecular structure of a surfactant and indicative of a balance between the hydrophilicity and hydrophobicity of the surfactant; generally, the value increases with the increase in hydrophilicity and decreases with the increase in hydrophobicity.

The nonionic surfactant (C) mentioned above is preferably a nonionic surfactant having no alkylphenol-derived molecular structure moiety within the molecular structure thereof.

The nonionic surfactant (C) preferably comprises a compound or compounds represented by the general formula (II), for instance:

$$R^b-O-A-H \quad (II)$$

wherein $R^b$ represents a straight or branched, saturated or unsaturated acyclic aliphatic hydrocarbon group containing 8 to 19 carbon atoms or a saturated cycloaliphatic hydrocarbon group containing 8 to 19 carbon atoms and A represents a polyoxyalkylene chain consisting of 3 to 25 oxyethylene groups and 0 to 5 oxypropylene groups.

The number of carbon atoms in the group $R^b$, the number of oxyethylene groups and the number of oxypropylene groups as given herein referring to the general formula (II) each are mean values for the molecules of the nonionic surfactant (C).

The acyclic aliphatic hydrocarbon group mentioned above is an aliphatic hydrocarbon group having no cyclic structure. The saturated cycloaliphatic hydrocarbon group mentioned above is a aliphatic hydrocarbon group having at least one saturated cyclic structure. The saturated cycloaliphatic hydrocarbon group may contain one or more saturated cyclic structures provided that it contains a total of 8 to 19 carbon atoms. The saturated cycloaliphatic hydrocarbon group maybe substituted in a manner such that one or more hydrogen atoms bound to a carbon atom or atoms in the saturated cyclic structure or structures are substituted by a straight or branched alkyl group or groups, provided that it contains a total of 8 to 19 carbon atoms.

Referring to the group $R^b$ in the above general formula (II), a preferred upper limit to the number of carbon atoms contained therein is 16, a more preferred upper limit thereto is 14, and a preferred lower limit thereto is 10, from the viewpoint that the fluororesin particles (A) can then show good dispersibility and the coating composition obtained can have good mechanical stability and storage stability. The number of carbon atoms contained in the group $R^b$ is still more preferably 13. Particularly preferred as the group $R^b$ is a saturated acyclic aliphatic hydrocarbon group containing 13 carbon atoms and, as such, there maybe mentioned, for example, tridecyl and isotridecyl.

When the number of oxypropylene groups in the group A in the above general formula (II) is in excess of 5, the dissolving power of the above-mentioned non-alkylphenol nonionic surfactant decreases and, therefore, the dispersibility of a particle comprising the fluororesin may be lowered and the coating composition may become inferior in mechanical stability and storage stability. It is preferred that the number of oxypropylene groups be as small as possible; a preferred upper limit thereto is 3. It is more preferred that no oxypropylene groups exist in the polyoxyalkylene chain mentioned above.

As for the number of oxyethylene groups in the polyoxyalkylene chain mentioned above, a preferred upper limit thereto is 7 and a more preferred upper limit thereto is 6, although the number may vary depending on the number of carbon atoms contained in the above-mentioned group $R^b$.

The polyoxyalkylene chain mentioned above is preferably one consisting of 3 to 7 oxyethylene groups and 0 to 3 oxypropylene groups, more preferably one consisting of 3 to 6 oxyethylene groups and containing no oxypropylene groups.

The orientation of the bond between —O— in the general formula (II) and A in the general formula (II) is such that a carbon atom in the polyoxyalkylene chain is adjacently bound to —O— in the general formula (II); when, for example, the oxyethylene group in the polyoxyalkylene chain is bound to —O—, the orientation of the bond between —O— and the adjacent oxyethylene group is as represented by —O—(CH$_2$CH$_2$O)—.

In the coating composition according to the invention, one or more nonionic surfactant species may be used as the nonionic surfactant (C). In that case, a HLB value thereof can be calculated from the HLB values of the respective nonionic surfactants and a mixing ratio therebetween.

In the coating composition according to the invention, the amount of the nonionic surfactant (C) is preferably 0.1% to 5% by mass relative to the fluororesin particles (A) from a mechanical stability viewpoint. A more preferred upper limit thereto is 4% by mass, and a still more preferred upper limit thereto is 3% by mass.

The content (N) of the nonionic surfactant (C) can be determined in the following manner. About 1 g (X g) of a sample is placed in an aluminum cup with a diameter of 5 cm and heated at 100° C. for 1 hour to give a heating residue (Y g). The heating residue (Y g) obtained is further heated at 300° C. for 1 hour to give a heating residue (Z g). The content in question is calculated according to the equation: $N=[(Y-Z)/Z]\times100(\%)$.

In the practice of the invention, the aqueous medium is not particularly restricted but may any water-containing one, for example a mixture of water and at least one organic solvent, or water. The aqueous medium is preferably a mixture of water and at least one organic solvent.

Preferred as the organic solvent is high-boiling polyhydric alcohol. The high-boiling polyhydric alcohol is preferred since they enhance an effect of inhibiting mud cracking in the step of drying following application of the coating composition according to the invention. After application, the coating composition according to the invention is dried generally at room temperature to 150° C. On that occasion, water evaporates first while the high-boiling polyhydric alcohol used in combination, which will not evaporate at the drying temperature or will evaporate at a slower rate than water, softens the resin particles (B), so that gaps hardly appear among the fluororesin particles (A) which are to form a coating film; thus, mud cracking can be prevented.

The high-boiling polyhydric alcohol mentioned above (hereinafter referred to as a polyhydric alcohol) contains two or more hydroxyl groups and has a boiling point not lower than 100° C. A nitrogen atom-containing polyhydric alcohol is not preferred since they cause discoloration due to thermal decomposition in the step of baking. Preferred are those having a boiling point not lower than the drying temperature of the coating composition, more preferably not lower than 150° C., particularly preferably not lower than 200° C. The polyhydric alcohol is preferably one containing 2 or 3 hydroxyl groups. Those containing one hydroxyl group or no hydroxyl group and having a boiling point not lower than 100° C. are inferior in hydrophilicity, so that homogeneous blending thereof is difficult to attain. Those containing 4 or more hydroxyl groups occur inmost cases as a solid at room temperature and, therefore, the mud cracking-inhibiting effect thereof can hardly be expected.

The above-mentioned polyhydric alcohol is required to be finally vaporized completely or decomposed and vaporized completely upon heating in the step of baking which is to be described later herein. Therefore, the boiling point or thermal decomposition temperature thereof is preferably not higher than the melting temperature of the fluororesin, more preferably not higher than 340° C.

As a polyhydric alcohol suited for use, there may be mentioned, for example, ethylene glycol (boiling point: 198° C., 1,2-propanediol (boiling point: 188° C.), 1,3-propanediol (boiling point: 214° C.), 1,2-butanediol (boiling point: 190° C.), 1,3-butanediol (boiling point: 208° C.), 1,4-butanediol (boiling point: 229° C.), 1,5-pentanediol (boiling point: 242° C.), 2-butene-1,4-diol (boiling point: 235° C.), glycerol (boiling point: 290° C.), 2-ethyl-2-hydroxymethyl-1,3-propanediol (boiling point: 295° C.) and 1,2,6-hexanetriol (boiling point: 178° C./5 mm Hg) as employed singly or in combination. Among them, glycerol is advantageous in view of its cost and safety, among others.

The polyhydric alcohol or alcohols are used generally in an amount of 5 to 18 parts, preferably 7 to 15 parts, more preferably 7 to 12 parts, relative to 100 parts (solid content) of the fluororesin particles (A). At addition levels lower than 5 parts, the mud cracking-inhibiting effect may be insignificant in some cases and, at levels exceeding 18 parts, the coating film may sometimes become turbid.

If necessary, an appropriate organic solvent other than the polyhydric alcohol may be used in combination with the aqueous medium mentioned above provided that the effect of the invention will not be adversely affected. As such an organic solvent, there may be mentioned, for example, an aromatic hydrocarbon solvent such as toluene and xylene, and an aliphatic hydrocarbon solvent containing 9 to 11 carbon atoms.

The coating composition according to the invention has a fluorine-containing surfactant content lower than 500 ppm relative to the above-mentioned fluororesin particles (A).

For a purpose of recovery, for instance, the fluorine-containing surfactant content is preferably not higher than 200 ppm, more preferably not higher than 100 ppm, relative to the solid content mass of the fluororesin particles (A).

The fluorine-containing surfactant content so referred to herein is determined in the following manner. Thus, an equal volume of methanol is added to the coating composition obtained, and the mixture is subjected to Soxhlet extraction, followed by high-performance liquid chromatography (HPLC) under the conditions specified below. Use is made of a working curve prepared by carrying out the above-mentioned extraction procedure and HPLC measurements under the same conditions.

(Measurement Conditions)
Column: ODS-120T (4.6 φ×250 mm, product of Tosoh Corporation)
Developing solution: Acetonitrile/0.6% (by mass) aqueous perchloric acid solution=1/1 (vol/vol %)
Sample size: 20 μL
Flow rate: 1.0 ml/minute
Detection wavelength: UV 210 nm
Column temperature: 40° C.

The above-mentioned fluorine-containing surfactant is a fluorine atom-containing compound showing surface activity. As the fluorine-containing surfactant, there may be mentioned a perfluorocarboxylic acid or salt thereof, a perfluorosulfonic acid or salt thereof, and a fluoroether compound, among others. As the fluorocarboxylic acid, there may be mentioned a perfluoroalkylcarboxylic acid such as perfluorooctanoic acid.

As the above-mentioned fluorine-containing surfactant, there maybe mentioned, for example, those described in U.S. Pat. No. 2,713,593, U.S. Pat. No. 5,476,974, Japanese Kokai Publication H10-212261, United States Patent Application Publication 2007/0015864, United States Patent Application Publication 2007/0015865, United States Patent Application Publication 2007/0015866, United States Patent Application Publication 2007/0117914, Japanese Kokai Publication 2006-321797, International Publication WO 2007/046345, International Publication WO 2007/046482, Japanese Kokai Publication 2002-317003, Japanese Kokai Publication 2003-119204, Japanese Kokai Publication 2005-036002 and International Publication WO 2005/003075.

As the fluorine-containing surfactant, there may also be mentioned a fluoroethercarboxylic acid represented by the general formula (i):

$$Rf^1OCHFCF_2ORf^2COOM^1 \quad (i)$$

wherein each of $Rf^1$ and $Rf^2$ represents partially or fully fluorinated alkyl or alkoxy group, and $M^1$ represents a monovalent alkali metal, $NH_4$ or H.

As the fluoroethercarboxylic acid represented by the general formula (i), there may be mentioned
$CF_3OCHFCF_2OCH_2CF_2COONH_4$,
$CF_3CF_2OCHFCF_2OCH_2CF_2COONH_4$ and
$CF_3CF_2CF_2OCHFCF_2OCH_2CF_2COONH_4$, for instance.

The fluoroethercarboxylic acids represented by the above general formula (i) can be produced, for example, by a production process comprising the step of causing a hydroxyalkanoic acid derivative represented by the general formula (1):

$$HOCH_2CF_2COOR^1 \quad (1)$$

wherein $R^1$ represents an alkyl group or H, to add to a fluorovinyl ether represented by the general formula (2):

$$CF_2=CFORf^1 \quad (2)$$

wherein $Rf^1$ is as defined above, in the presence of an alkali compound.

The alkali compound mentioned above is preferably an alcoholate. The alcoholate is, for example, sodium methoxide, sodium ethoxide or potassium tert-butoxide. A temperature in the above production process maybe selected according to a rate of the reaction between the reactants; when the reaction rate and a reaction selectivity are taken into consideration, however, it is generally about 0° C. to 200° C., preferably about 20° C. to 100° C. A pressure in the above production process is not particularly restricted but, when the reaction rate and an inhibition of polymerization of the fluorovinyl ether are taken into consideration, it is preferably about 0.1 to 3 MPa.

As the fluorine-containing surfactant, there may also be mentioned a fluoroethercarboxylic acid represented by the general formula (ii):

$$Rf^3OCF_2CF_2ORf^4COOM^1 \quad (ii)$$

wherein each of $Rf^3$ and $Rf^4$ represents partially or fully fluorinated alkyl or alkoxy group, and $M^1$ represents a monovalent alkali metal, $NH_4$ or H.

The fluoroethercarboxylic acid represented by the above general formula (ii) can be produced, for example, by bringing a fluoroethercarboxylic acid represented by the above general formula (i) into contact with fluorine.

As the above-mentioned fluorine-containing surfactant, there may also be mentioned a fluoroethercarboxylic acid represented by the general formula (iii):

$$CF_3(CF_2)_nOCH_2CF_2CF_2ORf^5COOM^1 \quad (iii)$$

wherein $Rf^5$ represents a partially or fully fluorinated alkyl group containing 2 carbon atoms, n represents 0 or 1 and $M^1$ represents a monovalent alkali metal, $NH_4$ or H.

As the fluoroethercarboxylic acid represented by the general formula (iii), there may be mentioned
$CF_3OCH_2CF_2CF_2OCH_2CF_2COONH_4$,
$CF_3OCH_2CF_2CF_2OCHFCF_2COONH_4$,
$CF_3OCH_2CF_2CF_2OCF_2CF_2COONH_4$,
$CF_3CF_2OCH_2CF_2CF_2OCH_2CF_2COONH_4$,
$CF_3CF_2OCH_2CF_2CF_2OCHFCF_2COONH_4$,
$CF_3CF_2OCH_2CF_2CF_2OCF_2CF_2COONH_4$, for instance.

The fluoroethercarboxylic acid represented by the above general formula (iii) can be produced, for example, by a process comprising the step of synthesizing a fluorocarboxylic acid fluoride (3-1) represented by the general formula (3-1):

$$CF_3(CF_2)_nOCH_2CF_2COF \quad (3-1)$$

wherein n is as defined above, by causing a ring-opening addition of tetrafluorooxetane to $(CF_3)_nCOF_{2-n}$, the step of synthesizing a fluorocarboxylic acid fluoride (3-2) represented by the general formula (3-2):

$$CF_3(CF_2)_nOCH_2CF_2CF_2ORf^6COF \quad (3-2)$$

wherein $Rf^6$ represents $CH_2CF_2$, $CHFCF_2$ or $CF_2CF_2$ and n is as defined above, by further causing a ring-opening addition of tetrafluorooxetane to the above fluorocarboxylic acid fluoride (3-1), if necessary followed by fluorination, and the step of converting the terminal —COF in the fluorocarboxylic acid fluoride (3-2) to —COOM$^1$.

The fluoroethercarboxylic acid represented by the above general formula (iii) can also be produced by a process comprising the step of synthesizing a fluorocarboxylic acid fluoride (3-1) represented by the general formula (3-1):

$$CF_3(CF_2)_nOCH_2CF_2COF \quad (3-1)$$

wherein n is as defined above, by causing the ring-opening addition of tetrafluorooxetane to $(CF_3)_nCOF_{2-n}$, the step of synthesizing a fluorocarboxylic acid fluoride (3-3) represented by the general formula (3-3):

$$CF_3(CF_2)_nOCH_2CF_2CF_2OCF(CF_3)COF \quad (3\text{-}3)$$

wherein n is as defined above, by causing the ring-opening addition of hexafluoroepoxypropane to the above fluorocarboxylic acid fluoride (3-1), and the step of converting the terminal —COF in the fluorocarboxylic acid fluoride (3-3) to —COOM$^1$.

The above-mentioned reaction between $(CF_3)_nCOF_{2-n}$ and tetrafluorooxetane can generally be carried out at a temperature of −50° C. to 50° C. and a pressure of 0 to 1 MPa with stirring for 1 to 24 hours.

The progress of the reaction between $(CF_3)_nCOF_{2-n}$ and tetrafluorooxetane is monitored by gas chromatography, for instance.

A proportion of $(CF_3)_nCOF_{2-n}$ relative to the total number of moles of $(CF_3)_nCOF_{2-n}$ and tetrafluorooxetane is preferably within a range of 9 to 95 mole percent. From a yield viewpoint, a more preferred lower limit to the proportion of $(CF_3)_nCOF_{2-n}$ can be set at 15 mole percent, and a more preferred upper limit thereto at 50 mole percent. A still more preferred lower limit thereto is 30 mole percent, and a still more preferred upper limit thereto is 40%.

As the above fluorine-containing surfactant, there may further be mentioned a fluoroethercarboxylic acid represented by the general formula (iv):

$$CF_3(CF_2)_nOCFX^1CF_2CF_2ORf^7COOM^1 \quad (iv)$$

wherein Rf$^7$ represents a partially or fully fluorinated alkyl group containing 2 carbon atoms, n represents 0 or 1, Me$^1$ represents a monovalent alkali metal, NH$_4$ or H and X$^1$ represents H or F.

The fluoroethercarboxylic acid represented by the above general formula (iv) can be produced, for example, by bringing a fluoroethercarboxylic acid represented by the above general formula (iii) into contact with fluorine.

As the above-mentioned fluorine-containing surfactant, there may further be mentioned a fluoroethercarboxylic acid represented by the general formula (v):

$$Rf^8OCH_2CF_2CF_2ORf^9COOM^1 \quad (v)$$

wherein Rf$^8$ represents a partially or fully fluorinated alkyl or alkoxy group, Rf$^9$ represents a fully fluorinated alkyl or alkoxy group and M$^1$ represents a monovalent alkali metal, NH4 or H.

As the fluoroethercarboxylic acid represented by the general formula (v), there may be mentioned CF$_3$CF$_2$OCH$_2$CF$_2$CF$_2$OCF$_2$COONH$_4$, CF$_3$OCH$_2$CF$_2$CF$_2$OCF$_2$COONH$_4$, CF$_3$OCH$_2$CF$_2$CF$_2$OCF$_2$CF$_2$COONH$_4$, CF$_3$CF$_2$CF$_2$OCH$_2$CF$_2$CF$_2$OCF$_2$COONH$_4$, CF$_3$CF$_2$OCH$_2$CF$_2$CF$_2$OCF$_2$COONH$_4$, CF$_3$CF$_2$OCH$_2$CF$_2$CF$_2$OCF$_2$CF$_2$COONH$_4$, for instance.

The fluoroethercarboxylic acids represented by the above general formula (v) can be produced, for example, by a production process comprising the step (1) of preparing a fluorocarboxylic acid fluoride (4) represented by the general formula (4):

$$Rf^8OCH_2CF_2COF \quad (4)$$

wherein Rf$^8$ is as defined above, by causing the ring-opening addition of tetrafluorooxetane to a fluorine-containing acid fluoride represented by Rf$^{10}$COF (in which Rf$^{10}$ is a group derived from the above-defined Rf$^8$ group by reducing the number of carbon atoms by one), the step (2) of producing a compound represented by the general formula (5):

$$Rf^8OCH_2CF_2CF_2OCF_2CF_2I \quad (5)$$

wherein Rf$^8$ is as defined above, by causing tetrafluoroethylene [TFE] and iodine to add to the above fluorocarboxylic acid fluoride (4) in the presence of an alkali metal fluoride, and the step (3) of subjecting the compound represented by the above general formula (5) to hydrolysis and reduction to give the corresponding fluoroethercarboxylic acid represented by the above general formula (v).

The above-mentioned reaction of a ring-opening addition of tetrafluorooxetane to the fluorine-containing acid fluoride of the above step (1) can generally be carried out at a temperature of −50° C. to 200° C. and a pressure of 0 to 1 MPa with stirring for 1 to 24 hours.

The progress of the reaction between the fluorine-containing acid fluoride of the above step (1) and tetrafluorooxetane is monitored by gas chromatography, for instance.

The proportion of the above fluorine-containing acid fluoride relative to the total number of moles of the fluorine-containing acid fluoride and tetrafluorooxetane is preferably within a range of 9 to 95 mole percent. From a yield viewpoint, a more preferred lower limit to the proportion of the fluorine-containing acid fluoride can be set at 15 mole percent, and a more preferred upper limit thereto at 50 mole percent. A still more preferred lower limit thereto is 30 mole percent, and a still more preferred upper limit thereto is 40%.

In the above step (2), tetrafluoroethylene and iodine are added to the compound represented by the general formula (5) preferably in a polar solvent containing an alkali metal fluoride while the temperature is maintained at −50° C. to 100° C. and the pressure at 0.05 to 3 MPa.

In the above step (3), the compound represented by the general formula (5) is subjected to hydrolysis and reduction to give the corresponding fluoroethercarboxylic acid through conversion to —COOM$^1$.

In the above hydrolysis and reduction step, the compound (5) is preferably heated at temperatures within a range of 20° C. to 100° C. in a polar solvent in the presence of water, Rongalit (HO—CH$_2$SO$_2$—Na) and sodium bicarbonate (NaHCO$_3$). As examples of the polar solvent, there may be mentioned DMF, DMSO, monoglyme, diglyme, triglyme and tetraglyme.

The fluoroethercarboxylic acid represented by the above general formula (v) can also be produced by a production process comprising the above-mentioned steps (1) and (2) and, in lieu of the above-mentioned step (3), the step (4) of preparing a compound represented by the general formula (6):

$$Rf^8OCH_2CF_2CF_2OCF_2CF_2CH_2CH_2I \quad (6)$$

wherein Rf$^8$ is as defined above, by further causing ethylene to add to the compound represented by the above general formula (5) and the step (5) of oxidizing the compound represented by the general formula (6) in the presence of an oxidizing agent to convert the terminal group to COOH and give the corresponding fluoroethercarboxylic acid to be used in the practice of the invention.

The addition of ethylene in the above-mentioned step (4) can be effected by heating the reaction compound represented by the general formula (5) and ethylene at 50° C. to 150° C. in the presence of a metal catalyst to thereby allow the reaction to proceed. The pressure in carrying out the addition reaction is generally 0.01 to 2 MPaG.

The addition of ethylene to the compound represented by the general formula (5) in the above step (4) can also be effected by allowing the reaction between the compound represented by the general formula (5) and ethylene to proceed within a temperature range of 50° C. to 150° C. in the presence of a compound decomposable within a specific temperature range to generate radicals, for example an organic peroxide or azo compound. A pressure for the addition reaction is generally 0.01 to 2 MPaG.

As the fluorine-containing surfactant mentioned above, there may further be mentioned a fluoroethercarboxylic acid represented by the general formula (vi):

$$Rf^{11}(OCF_2CF_2)_{n-1}OCF_2COOM^1 \quad (vi)$$

wherein $Rf^{11}$ represents a perfluoroalkyl group containing 1 to 3 carbon atoms, n represents 2 or 3 and $M^1$ represents a monovalent alkali metal, $NH_4$ or H.

As the fluoroethercarboxylic acid represented by the general formula (vi), there may be mentioned $CF_3CF_2OCF_2CF_2OCF_2COONH_4$, for instance.

The fluoroethercarboxylic acid represented by the general formula (vi) can be produced, for example, by a production process comprising the step of preparing a fluoroether iodide represented by the general formula (8):

$$Rf^{11}(OCF_2CF_2)_nI \quad (8)$$

wherein $Rf^{11}$ and n are as defined above, by causing tetrafluoroethylene and iodine to add to a fluorocarboxylic acid fluoride represented by the general formula (7):

$$Rf^{11}(OCF_2CF_2)_{n-2}OCF_2COF \quad (7)$$

wherein $Rf_{11}$ and n are as defined above, in the presence of an alkali metal fluoride, the step of producing a corresponding fluorocarboxylic acid fluoride represented by the general formula (9):

$$Rf^{11}(OCF_2CF_2)_{n-1}OCF_2COF \quad (9)$$

wherein $Rf^{11}$ and n are as defined above, by oxidizing the fluoroether iodide represented by the general formula (8) and the step of oxidizing the fluorocarboxylic acid fluoride represented by the general formula (9) in the presence of an acid or base.

In the above-mentioned step of addition of tetrafluoroethylene and iodine, tetrafluoroethylene and iodine are preferably allowed to add to the fluorocarboxylic acid fluoride represented by the general formula (7) in a polar solvent containing an alkali metal fluoride while the temperature is maintained at −50° C. to 50° C. and the pressure at 0.05 to 2 MPa.

As the above-mentioned alkali metal fluoride, there may be mentioned cesium fluoride, potassium fluoride and sodium fluoride, among others.

As examples of the polar solvent, there may be mentioned DMF, DMSO, monoglyme, diglyme, triglyme, tetraglyme as the like.

The iodine mentioned above may be not only $I_2$ but also iodine chloride, iodine bromide or the like.

The oxidation for the production of the fluorocarboxylic acid fluoride represented by the general formula (9) can be effected by maintaining the fluoroether iodide represented by the general formula (8) at 50° C. to 150° C. in water in the presence of an oxidizing agent for a predetermined period of time. Referring to the oxidizing agent, there may be mentioned, among others, the method comprising using fuming sulfuric acid for directly obtaining the acid fluoride, a method comprising preparing a corresponding carboxylic acid using chlorosulfonic acid, converting the latter to the acid chloride using thionyl chloride and further bringing the acid chloride into contact with an fluoride ion source such as KF to give the acid fluoride, and the method comprising preparing a corresponding carboxylic acid using chlorosulfonic acid and then treating the same with such a fluorinating reagent as 1,1,2,3,3,3-hexafluorodiethylaminopropane to give the acid fluoride.

The above-mentioned oxidation for the production of the fluoroethercarboxylic acid represented by the general formula (vi) can be effected by maintaining a fluorocarboxylic acid fluoride represented by the general formula (9) at 0° C. to 90° C. in water in the presence of an acid or base for a predetermined period of time. As the acid, there may be mentioned dilute sulfuric acid and dilute nitric acid, among others; as examples of the base, there may be mentioned potassium hydroxide and sodium hydroxide.

As the fluorine-containing surfactant mentioned above, there may further be mentioned a fluoroethercarboxylic acid represented by the general formula (vii):

$$Rf^{11}(OCF_2CF_2)_nCOOM^1 \quad (vii)$$

wherein $Rf^{11}$ represents a perfluoroalkyl group containing 1 to 3 carbon atoms, n represents 2 or 3 and $M^1$ represents a monovalent alkali metal, $NH_4$ or H.

As a fluoroethercarboxylic acid represented by the general formula (vii), there may be mentioned $CF_3CF_2OCF_2CF_2OCF_2CF_2COONH_4$ and $CF_2OCF_2CF_2OCF_2CF_2COONH_4$, for instance.

The fluoroethercarboxylic acid represented by the general formula (vii) can be produced, for example, by a production process comprising the step (1) of preparing a fluoroether iodide represented by the general formula (10):

$$Rf^{11}(OCF_2CF_2)_nCH_2CH_2I \quad (10)$$

wherein $R^{11}$ and n are as defined above, by causing ethylene to add to a fluoroether iodide represented by the general formula (8) given above and the step (2) of oxidizing the fluoroether iodide represented by the general formula (10) in the presence of an oxidizing agent.

The addition of ethylene to the fluoroether iodide in the above-mentioned step (1) can be effected by heating the fluoroether iodide and ethylene at 50° C. to 150° C. in the presence of a metal catalyst to thereby allow the reaction to proceed. A pressure in carrying out the addition reaction is generally 0.01 to 2 MPaG.

As the metal catalyst, there may be mentioned copper, for instance.

The addition of ethylene to the fluoroether iodide in the above step (1) can also be effected by allowing the reaction between the fluoroether iodide and ethylene to proceed within a temperature range of 50° C. to 150° C. in the presence of a compound decomposable within a specific temperature range to generate radicals, for example an organic peroxide or azo compound. A pressure for the addition reaction is generally 0.01 to 2 MPaG.

The oxidation in the above step (2) can be effected by maintaining the compound represented by the general formula (10) at 5° C. to 150° C. in water in the presence of an oxidizing agent for a predetermined period of time. As the oxidizing agent, there may be mentioned potassium permanganate, among others.

As the above-mentioned fluorine-containing surfactant, there may further be mentioned a ω-hydrofluoroethercarboxylic acid represented by the general formula (viii):

$$HCF_2CF_2Rf^{12}—ORf^{13}COOM^1 \quad (viii)$$

wherein $Rf^{12}$ represents a perfluoroalkyl or perfluoroalkoxy group containing 1 to 8 carbon atoms, $Rf^{13}$, which is the same as or different from $Rf^{12}$, represents a perfluoroalkyl or perfluoroalkoxy group containing 1 to 3 carbon atoms and $M^1$ represents a monovalent alkali metal, $NH_4$ or H.

As the ω-hydrofluoroethercarboxylic acid represented by the general formula (viii), there may be mentioned $HCF_2CF_2CF_2OCF_2CF_2OCF_2COOM^1$, $HCF_2CF_2CF_2CF_2CF_2OCF_2COOM^1$, $HCF_2CF_2CF_2OCF_2CF_2OCF_2CF_2COOM^1$, $HCF_2CF_2CF_2CF_2CF_2OCF_2CF_2COOM^1$, $HCF_2CF_2CF_2OCF_2CF_2OCF(CF_3)COOM^1$ and $HCF_2CF_2CF_2CF_2CF_2OCF(CF_3)COOM^1$, for instance.

The ω-hydrofluoroethercarboxylic acid represented by the above general formula (viii) can be produced, for example, by a production process comprising the step of producing an ω-hydrofluoroether iodide represented by the general formula (12):

$$HCF_2CF_2Rf^{12}OCF_2CF_2I \quad (12)$$

wherein $Rf^{12}$ represents a perfluoroalkyl or perfluoroalkoxy group containing 1 to 8 carbon atoms, by causing tetrafluoroethylene and iodine to add to an ω-hydrofluorocarboxylic acid fluoride represented by the general formula (11):

$$HCF_2CF_2Rf^{12}COF \quad (11)$$

wherein $R^{14}$ represents a group derived from $Rf^{12}$ by reducing the number of carbon atoms by one and $Rf^{12}$ represents a perfluoroalkyl or perfluoroalkoxy group containing 1 to 8 carbon atoms, in the presence of an alkali metal fluoride, the step of oxidizing the ω-hydrofluoroether iodide represented by the general formula (12) to give a corresponding ω-hydrofluorocarboxylic acid fluoride represented by the general formula (13):

$$HCF_2CF_2Rf^{12}OCF_2COF \quad (13)$$

wherein $Rf^{12}$ represents a perfluoroalkyl or perfluoroalkoxy group containing 1 to 8 carbon atoms, and the step of oxidizing the ω-hydrofluorocarboxylic acid fluoride represented by the general formula (13) to give a corresponding ω-hydrofluoroethercarboxylic acid represented by the general formula (14):

$$HCF_2CF_2Rf^{12}OCF_2COOM^1 \quad (14)$$

wherein $Rf^{12}$ represents a perfluoroalkyl or perfluoroalkoxy group containing 1 to 8 carbon atoms and $M^1$ represents a monovalent alkali metal, $NH_4$ or H.

In the above-mentioned step of addition of tetrafluoroethylene and iodine, tetrafluoroethylene and iodine are preferably allowed to add to the ω-hydrofluorocarboxylic acid fluoride represented by the general formula (11) in a polar solvent containing an alkali metal fluoride while the temperature is maintained at −50° C. to 50° C. and the pressure at 0.05 to 2 MPa.

As the above-mentioned alkali metal fluoride, there may be mentioned cesium fluoride, potassium fluoride and sodium fluoride, among others.

As examples of the polar solvent, there may be mentioned DMF, DMSO, monoglyme, diglyme, triglyme, tetraglyme as the like.

The iodine mentioned above may be not only $I_2$ but also iodine chloride, iodine bromide or the like.

The oxidation for the production of the ω-hydrofluorocarboxylic acid fluoride represented by the general formula (13) can be effected by maintaining the ω-hydrofluoroether iodide represented by the general formula (12) at 50° C. to 150° C. in water in the presence of an oxidizing agent for a predetermined period of time. Referring to the oxidizing agent, there may be mentioned, among others, the method comprising using fuming sulfuric acid for directly obtaining the acid fluoride, the method comprising preparing a corresponding carboxylic acid using chlorosulfonic acid, converting the latter to the acid chloride using thionyl chloride and further bringing the acid chloride into contact with an fluoride ion source such as KF to give the acid fluoride, and the method comprising preparing a corresponding carboxylic acid using chlorosulfonic acid and then treating the same with such a fluorinating reagent as 1,1,2,3,3,3-hexafluorodiethylaminopropane to give the acid fluoride.

The above-mentioned oxidation for the production of the fluoroethercarboxylic acid can be effected by maintaining a fluorocarboxylic acid fluoride represented by the general formula (13) at 0° C. to 90° C. in water in the presence of an acid or base for a predetermined period of time. As the acid, there may be mentioned dilute sulfuric acid and dilute nitric acid, among others; as examples of the base, there may be mentioned potassium hydroxide and sodium hydroxide.

The ω-hydrofluoroethercarboxylic acid represented by the general formula (viii) can also be produced by a production process comprising the step (1) of causing ethylene to add to an ω-hydrofluoroether iodide represented by the general formula (12) given above to give a corresponding ω-hydrofluoroether iodide represented by the general formula (15):

$$HCF_2CF_2Rf^{12}OCF_2CF_2CH_2CH_2I \quad (15)$$

wherein $Rf^{12}$ represents a perfluoroalkyl or perfluoroalkoxy group containing 1 to 8 carbon atoms, and the step (2) of oxidizing the ω-hydrofluoroether iodide represented by the general formula (15) in the presence of an oxidizing agent to give a corresponding ω-hydrofluoroethercarboxylic acid represented by the general formula (16):

$$HCF_2CF_2Rf^{12}OCF_2CF_2COOM^1 \quad (16)$$

wherein $Rf^{12}$ represents a perfluoroalkyl or perfluoroalkoxy group containing 1 to 8 carbon atoms and $M^1$ represents a monovalent alkali metal, $NH_4$ or H.

The addition of ethylene to ω-hydrofluoroether iodide in the above-mentioned step (1) can be effected by heating ω-hydrofluoroether iodide and ethylene at 50° C. to 150° C. in the presence of a metal catalyst to thereby allow the reaction to proceed. A pressure in carrying out the addition reaction is generally 0.01 to 2 MPaG.

As the metal catalyst, there maybe mentioned copper, for instance.

The addition of ethylene to ω-hydrofluoroether iodide in the above step (1) can also be effected by allowing the reaction between ω-hydrofluoroether iodide and ethylene to proceed within a temperature range of 50° C. to 150° C. in the presence of a compound decomposable within a specific temperature range to generate radicals, for example an organic peroxide or azo compound. A pressure for the addition reaction is generally 0.01 to 2 MPaG.

The oxidation in the above step (2) can be effected by maintaining the ω-hydrofluoroether iodide represented by the general formula (15) at 5° C. to 150° C. in water in the presence of an oxidizing agent for a predetermined period of time. As the acid, there maybe mentioned potassium permanganate, among others.

As the above-mentioned fluorine-containing surfactant, there may further be mentioned a compound represented by the general formula (ix):

$$Rf^{15}-CH_2O-CF_2-CHF-Rf^{16}-X^2 \quad (ix)$$

wherein $Rf^{15}$ represents a fluoroalkyl group containing 1 to 5 carbon atoms, $Rf^{16}$ represents a fluoroalkylene group containing 1 to 3 carbon atoms and $X^2$ represents $-COOM^2$ or $-SO_3M^2$ in which $M^2$ represents K, Na or $NH_4$. As a typical compound represented by the above general formula (ix), there may be mentioned $CF_3CF_2CH_2OCF_2CFHCF_2COOH$ and $CF_3CF_2CH_2OCF_2CFHCF_2COONH_4$, among others.

The compound represented by the general formula (ix) can be produced, for example, by a production process comprising the step of causing a compound (a2) represented by the formula $Rf^{15}$—$CH_2OH$ (in which $Rf^{15}$ represents a fluoroalkyl group containing 1 to 5 carbon atoms) to add to a compound (a1) represented by the formula $CF_2$=$CF$—$Rf^{16}$—$X^2$ (in which $Rf^{16}$ represents a fluoroalkylene group containing 1 to 3 carbon atoms and $X^2$ represents —$COOM^2$ or —$SO_3M^2$; $M^2$ represents K, Na or $NH_4$) in an aqueous medium under alkaline conditions to give a corresponding compound (a) represented by the formula $Rf^{15}$—$CH_2O$—$CF_2$—$CHF$—$Rf^{16}$—$X^2$ (in which $Rf^{15}$, $Rf^{16}$ and $X^2$ are as defined above).

In the above step, the reaction between the compound (a1) and the (a2) can be carried out, for example, at a temperature of 0° C. to 200° C. after mixing the compound (a1) and the (a2) in a ratio close to the stoichiometric mixture ratio.

In the method in which the compound is contacted with fluorine gas, fluorine gas is preferably mixed with an inert gas such as nitrogen and helium and used at a concentration of 10% to 50% by volume.

Fluorine gas is preferably carried out at a temperature of 50° C. to 200° C. The contact with fluorine gas is preferably carried out under a pressure of 1 kPa to 0.1 MPa.

As the above-mentioned fluorine-containing surfactant, there may further be mentioned a compound represented by the general formula (x):

$$Rf^{17}\text{—}O\text{—}CF_2\text{—}Rf^{18}\text{—}X^2 \quad (x)$$

wherein $Rf^{17}$ represents a fluoroalkyl group containing 1 to 6 carbon atoms, $Rf^{18}$ represents a fluoroalkylene group containing 1 to 4 carbon atoms and $X^2$ is as defined above. As a typical compound represented by the above general formula (x), there may be mentioned $CF_3CF_2CF_2OCF_2CF_2CF_2COOH$, $CF_3CF_2CF_2OCF_2CF_2CF_2COONH4$, $CF_3CF_2CHFOCF_2CHFCF_2COOH$ and $CF_3CF_2CHFOCF_2CHFCF_2COONH_4$, for instance.

The compound represented by the general formula (x) can be produced, for example, by a production process comprising the step of fluorinating the compound (a) mentioned above to give a fluorinated compound represented by the formula $Rf^{17}$—O—$CF_2$—$Rf^{18}$—$X^2$ (in which $Rf^{17}$ represents a fluoroalkyl group containing 1 to 6 carbon atoms, $Rf^{18}$ represents a fluoroalkylene group containing 1 to 4 carbon atoms and $X^2$ is as defined above).

The fluorination mentioned above can be effected by any method known in the art, for example by the method comprising contacting with gaseous fluorine or the method comprising extruding while applying high shearing force. The mode of the above fluorination reaction can be properly selected according to the number of carbon atoms in the compound mentioned above and a reaction scale, for instance; for example, the reaction can be carried out under the following conditions.

In the method in which the compound is contacted with fluorine gas, fluorine gas is preferably mixed with inert gas such as nitrogen and helium and used at a concentration of 10% to 50% by volume.

Fluorine gas is preferably carried out at a temperature of 50° C. to 200° C. The contact with fluorine gas is preferably carried out under a pressure of 1 kPa to 0.1 MPa.

As the above-mentioned fluorine-containing surfactant, there may still further be mentioned a mixture prepared from two or more compounds each represented by the general formula (xi):

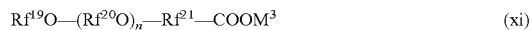

$$Rf^{19}O\text{—}(Rf^{20}O)_n\text{—}Rf^{21}\text{—}COOM^3 \quad (xi)$$

wherein $R^{19}$ represents a fluoroalkyl group containing 1 to 3 carbon atoms, $Rf^{20}$ and $Rf^{21}$ are the same or different and each represents a fluoroalkylene group containing 1 to 3 carbon atoms and $M^3$ represents H, K, Na or $NH_4$, and differing in the value of n, with an average n value of 2 to 5.

As such a mixture, there may be mentioned, for example, a mixture obtained by blending the compounds $CF_3O(CF_2O)_4CF_2COOH$ and $CF_3O(CF_2O)_5CF_2COONH_4$, both represented by the general formula (xi), in a ratio of 90% to 10% and having an average n value of 4.1, a mixture obtained by blending the compounds $CF_3O(CF_2O)_3CF_2COOH$ and $CF_3O(CF_2O)_5CF_2COONH_4$, both represented by the general formula (xi), in a ratio of 90% to 10% and having an average n value of 3.1, and a mixture obtained by blending the compounds $CF_3O(CF_2O)_3CF_2COOH$ and $CF_3O(CF_2O)_4CF_2COONH_4$, both represented by the general formula (xi), in a ratio of 90% to 10% and having an average n value of 3.1.

The compound represented by the above general formula (xi) can be prepared by any method known in the art, for example by the method described in United States Patent Application 2007-0015864.

In such a method of preparation, a mixture of byproducts formed on the occasion of production of an epoxy compound represented by the formula:

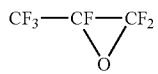

from $CF_3$—$CF$=$CF_2$ and $O_2$ used as starting materials, namely the compounds $CF_3O\ (CF_2O)_nCF_2COF$ and $CF_3O\ (CF_2O)_nCOF$ (in each formula, n being as defined above), is subjected to hydrolysis in the presence of an alkali to convert the above $CF_3O(CF_2O)_nCF_2COF$ to $CF_2O(CF_2O)_nCF_2COOM^3$ ($M^3$ being as defined above), whereby the desired mixture can be obtained.

As the alkali compound to be used in the above-mentioned hydrolysis, there may be mentioned, for example, KOH. The hydrolysis can be readily carried out by adding an acid, such as HCl, to the above mixture in the presence of the alkali.

The above-mentioned mixture of compounds represented by the general formula (xi) can be obtained, for example, through the step (1) of preparing the compounds (xi) each independently and the step (2) of blending the respective compounds (xi) obtained. The mixture can also be obtained by the method comprising causing two or more compounds (xi) to be contained in that mixture by selecting rectification conditions on the occasion of rectifying a mixture of compounds (xi) obtained by a method known in the art.

The coating composition according to the invention may contain, if necessary, a further resin unless this adversely affects the characteristic features of the invention. The incorporation of the further resin can result in improvements in film-forming property and corrosion resistance, among others, of the coating film obtained from the coating composition.

The further resin is not particularly restricted but includes, among others, polyethylene oxide (dispersion stabilizer), phenol resins, urea resins, epoxy resins, melamine resins, polyester resins, polyether resins, acrylic silicone resins, silicone resins and silicone polyester resins.

The coating composition according to the invention may further contain one or more of additives commonly used in an ordinary coating composition as incorporated for the purpose of improving coating performance and properties of the coating film obtained unless the characteristic features of the invention are adversely affected.

The above-mentioned additive is not particularly restricted but can be selected according to the intended use of the coated article obtained; thus, there may be mentioned, for example, leveling agents, solid lubricants, wood meal, quartz sand, carbon black, diamond, tourmaline, germanium, alumina, silicon nitride, fluorite, clays, talc, extender pigments, various extenders, electrically conductive fillers, lustering agents, pigments, fillers, pigment dispersants, antisettling agents, water absorbents, surface modifiers, thixotropic agents, viscosity modifiers, antigelling agents, ultraviolet absorbers, light stabilizers, plasticizers, antiflooding agents, antiskinning agents, anti-scratch agents, antifungal agents, antibacterial agents, antioxidants, antistatic agents, silane coupling agents, antifoaming agents, drying agents and anticissing agents.

As the above-mentioned lustering agents, there may be mentioned, for example, mica, metal powders, glass beads, glass bubbles, glass flakes and glass fibers.

The metal powder is not particularly restricted but there may be mentioned, for example, powders of simple substance metals such as aluminum, iron, tin, zinc, gold, silver and copper; and powders of alloys such as aluminum alloys and stainless steels. The metal powder mentioned above is not particularly restricted in form but granular and flaky forms, among others, may be mentioned. When it contains one or more of such a lustering agent, the coating composition according to the invention can form coating films excellent in external appearance. The lustering agent content is preferably 0.1% to 10.0% by mass relative to the solid content in the coating composition.

As the above-mentioned viscosity modifier, there may be mentioned, for example, methylcellulose, alumina sol, polyvinyl alcohol and carboxylated vinyl polymers.

As the above-mentioned antifoaming agent, there may be mentioned, for example, nonpolar solvents such as toluene, xylene and hydrocarbons containing 9 to 11 carbon atoms, and silicone oils.

As the drying agent, there may be mentioned cobalt oxide and the like.

The coating composition according to the invention preferably has a viscosity at 25° C. of 0.1 to 50000 mPa·s. When the viscosity is lower than 0.1 mPa·s, sagging, among others, may readily occur on the occasion of application to an article to be coated, often making it difficult to obtain the desired coating film thickness and, when it is higher than 50000 mPa·s, the coating performance may become poor and a resulting coating film thickness will not become uniform and the coating film will be inferior in surface smoothness, among others, in some instances. A more preferred lower limit to that viscosity is 1 mPa·s, and a more preferred upper limit thereto is 30000 mPa·s. The viscosity mentioned above is a value obtained by measurement using a BM type rotating spindle viscometer (product of Tokyo Keiki Inc.).

The coating composition according to the invention can be obtained, for example, by (1) preparing a fluororesin-containing aqueous dispersion having a low fluorine-containing surfactant content and then (2) admixing the aqueous dispersion obtained with a resin particle (B), if necessary together with a nonionic surfactant (C), an aqueous medium, an organic solvent, an additive or additives, etc.

In the step mentioned above under (1), the fluororesin-containing aqueous dispersion can be obtained by preparing an aqueous dispersion containing a fluororesin particle (A) by any method known in the art, for example by emulsion polymerization, and subjecting the aqueous dispersion to a procedure for removing the fluorine-containing surfactant.

The procedure for removing the fluorine-containing surfactant is not particularly restricted but may be such a procedure known in the art as a procedure comprising bringing the dispersion into contact with an anion exchange resin or the procedure comprising adding a nonionic surfactant, followed by phase separation for concentration. These procedures may each be repeated or, alternatively, they may be combined; for example, the procedure for contacting with an anion exchange resin is carried out after concentration by phase separation. If necessary, the nonionic surfactant (C1) may be added in these procedures for the purpose of stabilizing the fluororesin-containing aqueous dispersion obtained.

The nonionic surfactant (C1) mentioned above is not particularly restricted but any of those known in the art can be used.

The nonionic surfactant (C1) preferably has an HLB exceeding 10.0 but not exceeding 16.0.

Although the nonionic surfactant (C1) maybe of the same type as the nonionic surfactant (C) mentioned above, it is preferred, from a dispersion stability viewpoint, that it has a higher HLB as compared with the nonionic surfactant (C), more preferably an HLB of 12.0 to 14.0.

The fluororesin-containing aqueous dispersion preferably contains the fluororesin particles (A) mentioned above at a content level of 35% to 70% by mass. A more preferred lower limit to the content is 40% by mass, and a more preferred upper limit thereto is 65% by mass.

The above-mentioned content of the fluororesin particles (A) in the fluororesin-containing aqueous dispersion is the mass of the heating residue, as expressed in terms of percentage relative to the mass (1 g) of the aqueous dispersion, obtained by drying 1 g of the aqueous dispersion in an air blow drier at 100° C. for 1 hour and further at 300° C. for 1 hour.

The content of the above-mentioned fluorine-containing surfactant in the fluororesin-containing aqueous dispersion is preferably lower than 500 ppm relative to the solid content mass of the above-mentioned fluororesin particles (A). The fluorine-containing surfactant content is more preferably not higher than 200 ppm, still more preferably not higher than 100 ppm, relative to the solid content mass of the fluororesin particles (A).

The content of the above-mentioned nonionic surfactant (C1) in the fluororesin-containing aqueous dispersion mentioned above is preferably 0.1% to 10% by mass relative to the fluororesin particles (A). A more preferred lower limit thereto is 1% by mass, a more preferred upper limit thereto is 6% by mass, and a still more preferred upper limit thereto is 4% by mass.

The content (N) of the nonionic surfactant (C1) is determined in the following manner. About 1 g (X g) of the sample is placed in an aluminum cup with a diameter of 5 cm and heated at 100° C. for 1 hour to give a heating residue (Y g). The heating residue (Y g) obtained is further heated at 300° C. for 1 hour to give a heating residue (Z g). The content in question is calculated according to the equation: $N=[(Y-Z)/Z]\times 100(\%)$.

In the step (2) mentioned above, the fluororesin-containing aqueous dispersion mentioned above is admixed with the resin particle (B), nonionic surfactant (C), aqueous medium, etc. so that the contents of the fluororesin particles (A), the resin particles (B), the nonionic surfactant (C) and the fluorine-containing surfactant may fall within the respective content ranges specified herein, and the mixture is then stirred. The resin particle (B) may be incorporated, in the form of an emulsion of the resin particle (B) as prepared in advance, into the fluororesin-containing aqueous dispersion.

In the above step (2), the nonionic surfactant (C1), the further resin and/or additive(s) mentioned above may be added according to need.

A method of producing the coating composition according to the invention which comprises the step of admixing an aqueous dispersion containing the above-mentioned fluororesin particle (A), the nonionic surfactant (C1) and the fluorine-containing surfactant and having a fluorine-containing surfactant content lower than 500 ppm relative to the fluororesin particles (A) with a nonionic surfactant (C2) having an HLB value not lower than 5.0 but not higher than 10.0 and the above-mentioned resin particle (B) also constitutes an aspect of the present invention.

In carrying out the production method according to the invention, the above-mentioned aqueous dispersion is not particularly restricted but can be prepared by the same technique as in the above-mentioned step (1).

In the above aqueous dispersion, the fluororesin particle (A), the nonionic surfactant (C1) and the fluorine-containing surfactant are the same as the respective ones described hereinabove referring to the coating composition according to the invention.

The content of the nonionic surfactant (C1) in the above aqueous dispersion is preferably 0.1% to 10% by mass relative to the fluororesin particles (A).

The nonionic surfactant (C2) mentioned above has an HLB value not lower than 5.0 but not higher than 10.0. The nonionic surfactant (C2) can be incorporated as an equivalent to the nonionic surfactant (C) described hereinabove referring the coating composition according to the invention.

In the step mentioned above, the nonionic surfactant (C2) is incorporated preferably in an amount of 0.1% to 5% by mass, more preferably in an amount of 1% to 4% by mass, relative to the fluororesin particles (A).

The resin particles (B) are preferably incorporated in an amount of 5% to 25% by mass relative to the fluororesin particles (A).

In the above step, the nonionic surfactant (C1), the further resin and/or additive(s) mentioned above may further be incorporated according to need.

The coating composition according to the invention is useful, for example, as a coating, in particular as a top-coat coating. The coating composition mentioned above may be directly applied to an article to be coated; for achieving improvements in adhesion, however, the composition is preferably used as a top-coat coating after providing each article with a primer layer.

The primer layer is preferably one obtained from a fluororesin-containing coating. In this case, the coating film mentioned above shows affinity for the fluororesin in the primer layer, so that good adhesion is provided between the primer layer and the top coat.

The fluororesin in the primer coating is not particularly restricted but mention may be made of PTFE, PFA and FEP, for example. From the viewpoint of improved interlaminar bonding between the above-mentioned coat film and the top coat film, use is preferably made of the same fluororesin as used in the coating composition according to the invention or one similar thereto in such property as melt-processability or non-melt-processability.

In the primer coating mentioned above, there may further be incorporated one or more of the additives known in the art, like the various additives usable in the coating composition mentioned above, for the purpose of improving the coating performance and/or properties of the coating film obtained.

The above-mentioned primer layer can be obtained by applying the primer coating in the same manner as in applying the coating composition according to the invention. The primer layer preferably has a layer thickness of 1 to 100μm.

Application of the coating composition according to the invention can form a coating film.

The article to be coated in the above application is not particularly restricted but there maybe mentioned, for example, a simple substance metal such as iron, aluminum and copper and alloy based on these metals; and a nonmetallic inorganic material such as enamels, glass and ceramics. Among the above-mentioned alloy, there may be mentioned stainless steels.

The above-mentioned article to be coated is preferably subjected, in advance, to surface treatment such as degreasing or surface roughening treatment since such treatment enables uniform application of the coating composition and improves an adhesion thereof to the article to be coated. The method of surface roughening treatment is not particularly restricted but includes chemical etching using an acid or alkali, anodic oxidation (alumite treatment) and sandblasting, among others.

The method of applying the above-mentioned coating composition in the above coating process is not particularly restricted but mention may be made of spray coating, roll coating, coating using a doctor blade, dip coating, spin flow coating and curtain flow coating, for instance.

The drying in the above coating process can be effected by a method known in the art, for example at a temperature of room temperature to 150° C. for 5 to 20 minutes.

In the above coating process, the baking is generally carried out at 260° C. to 415° C. for 5 to 30 minutes, although the conditions may vary according to the fluororesin species in the coating composition.

Upon such baking, the coating composition according to the invention will not allow a thermal shrinkage-due cracking since the resin particles (B) function as a binder until completion of melting of the fluororesin particles (A).

In the case of a primer layer being applied to the substrate, the above baking may be carried out on the occasion of application of the coating composition according to the invention after the primer layer formation by a series of steps of applying, drying and baking, (two-coat two-bake method) or, alternatively, both the primer layer and top coat may be baked simultaneously after application of the primer layer and drying the same and further application thereon of the coating composition and drying the same (two-coat one-bake method).

A thickness of the coating films obtained from the coating composition according to the invention is not particularly restricted but preferably is 10 to 100 μm.

The use of the coating composition according to the invention is not particularly restricted but, for example, the composition can be used as a covering material for those products whose surface is required to be provided with heat resistance, nonstickiness, lubricant properties and so forth.

As for such use, there may be mentioned, for example, cooking utensils such as frying pans, grill pans, pressure cookers, other various pans, rice cookers, rice cake makers, ovens, hot plates, bread-baking molds, kitchen knives and gas ranges; electric kettles, ice trays and other vessels for eating and drinking; articles for food industry such as kneading rolls, rolling rolls, conveyers and hoppers; articles for industrial use such as rolls, belts and paper separators in office automation [OA] equipment, papermaking rolls and calendering rolls for film manufacture; mold release agents for molds for foamed polystyrene manufacture, casting molds, and mold release plates for manufacturing plywood and decorative laminated sheets; kitchen equipment such as range hoods; conveyer belts and other members in equipment for manufacturing frozen foods; tools such as saws, files, dies and drills; household utensils such as irons, scissors and knives; metal foils, electric cables; sliding bearings in food processing machines, packaging machines, spinning machines, etc.; sliding parts in cameras and time pieces; automotive parts such as pipes, valves and bearings, snow shovels, plows, chutes, ship bottoms, boilers, and industrial containers (especially for use in a semiconductor industry).

Such coated articles obtained by applying the coating composition according to the invention as enumerated above also constitute an aspect of the present invention.

Effects of the Invention

The coating composition according to the invention, which has the constitution described hereinabove, is excellent in coating performance and can give a coating film excellent in adhesion to the article to be coated in spite of the fact that the fluorine-containing surfactant content therein is low.

Best Modes for Carrying out the Invention

The following examples illustrate the present invention in further detail. These examples are, however, by no means limitative of the scope of the present invention. Hereinafter, "%" and "part(s)" mean "% by mass" and "parts by mass", respectively.

In each of the examples, inclusive of a comparative example, physical property measurements were carried out according to the following methods.

(1) Diameter of Particles Consisting of Resin Particles (B)

Measurements were made by observation under a transmission electron microscope.

(2) Concentration of Fluororesin Particles (A) in the Fluororesin-Containing Aqueous Dispersion The mass of a heating residue obtained by drying 1 g of the aqueous dispersion in an air blow drier at 100° C. for 1 hour and further at 300° C. for 1 hour was expressed in terms of percentage relative to the mass (1 g) of the aqueous dispersion.

(3) Average Particle Diameter of Fluororesin Particles (A)

Measurements were made by observation under a transmission electron microscope.

(4) Concentration of Nonionic Surfactant (C)

About 1 g (X g) of a sample was placed in an aluminum cup with a diameter of 5 cm and heated at 100° C. for 1 hour to give a heating residue (Y g). The heating residue (Y g) obtained was further heated at 300° C. for 1 hour to give a heating residue (Z g). The concentration in question was calculated according to the equation: $N=[(Y-Z)/Z]\times 100(\%)$.

(5) Fluorine-Containing Surfactant Concentration

An equal volume of methanol is added to the coating composition obtained, and the mixture is subjected to Soxhlet extraction, followed by high-performance liquid chromatography (HPLC) under the conditions specified below. Use is made of a working curve prepared by carrying out the above-mentioned extraction procedure and HPLC measurements under the same conditions.

(Measurement Conditions)

Column: ODS-120T (4.6 φ×250 mm, product of Tosoh Corporation)
Developing solution: Acetonitrile/0.6% (by mass) aqueous perchloric acid solution=1/1 (vol/vol %)
Sample size: 20 μL
Flow rate: 1.0 ml/minute
Detection wavelength: UV 210 nm
Column temperature: 40° C.

PRODUCTION EXAMPLE

Preparation of Aqueous Polytetrafluoroethylene [PTFE] Dispersion (1) A 5-L reaction vessel was charged with 2000 g of a PTFE dispersion (PTFE content 25%, average particle diameter 0.24 μm, ammonium perfluorooctanoate [PFOA] content: an amount corresponding to 2000 ppm of PTFE), the charge was adjusted to pH 9 with 10% aqueous ammonia and, then, 125 g of a polyether nonionic surfactant (HLB value=13.0) was added with stirring at 120 rpm, and the contents were uniformly mixed up at 40° C. in a warm water bath. While the stirring was continued, the warm water bath temperature was raised for the inside temperature to arrive at 70° C., whereupon the stirring was discontinued. The inside temperature was then maintained at 70° C. for 6 hours and, then, the supernatant phase that had separated was removed and the aqueous PTFE dispersion phase was recovered.

The thus-obtained aqueous PTFE dispersion (concentrated aqueous dispersion) had a PTFE concentration of 70.5%; the content of the polyether nonionic surfactant was at a level corresponding to 3.0% of PTFE, and the PFOA content was at a level corresponding to 932 ppm of PTFE.

To this aqueous dispersion were added a polyether nonionic surfactant (HLB value=13.0) and deionized water to thereby adjust the PTFE concentration to 60% and the content of the polyether nonionic surfactant to a level corresponding to 6.0% of PTFE.

(2) The thus-obtained aqueous PTFE dispersion (2000 g) was passed through a column (2 cm in diameter) packed with 50 ml of an anion exchange resin (product name: Amberlite IRA 402J, product of Rohm and Haas Company) at a temperature of 50° C. and at a space velocity [SV] of 2 to give an aqueous PTFE dispersion.

The aqueous PTFE dispersion obtained had an average PTFE particle diameter of 0.24 μm and a solid content of 60% and contained the polyether nonionic surfactant (HLB value=13.0) as a dispersant in an amount corresponding to 6% of the solid matter PTFE; the PFOA content was at a level corresponding to 90 ppm of PTFE.

Example 1

A 787-g portion of the aqueous PTFE dispersion obtained in Production Example (2) was added to 118 g of a decomposable acrylic resin emulsion (butyl acrylate-based resin, average particle diameter 0.3 μm, resin concentration 40%), followed by addition of 47 g of glycerol, 47 g of a 20% aqueous solution of a polyether nonionic surfactant (HLB value=13.0) and 19 g of a thickening agent (25% aqueous solution of sodium lauryl sulfate) and further followed by addition of 11.8g of a 20% aqueous solution of polyoxyethylene tridecyl ether (HLB=9.5) (amount of polyoxyethylene tridecyl ether corresponding to 0.5% of PTFE solid matter) to give the coating composition having a PTFE solid content of 45.9%, a depolymerizable acrylic resin solid content of 4.6% and a PFOA content corresponding to 90 ppm of the PTFE solid content.

A 100-ml portion of the coating composition obtained was stirred at 300 rpm at 40° C. for 6 hours; no aggregates were formed and the mechanical stability was good.

The coating composition obtained was applied to non-blasted aluminum sheets by spraying, followed by 15 minutes of drying at 80° C. The dried coating films were then baked at 380° C. for 20 minutes to form the melt-formed coating films. The surface of each coat was observed macroscopically and examined as to whether there were hard spots (lumps) made of the coating. The surface condition was evaluated according to the following criteria.

(Evaluation Criteria)
O: No hard spots caused by the coating on the coat surface (good mechanical stability and good coating performance of the coating composition)
X: At least one hard spot caused by the coating observed on the coat surface (poor mechanical stability and poor coating performance of the coating composition)

Comparative Example 1

The coating composition was prepared in the same manner as in Example 1 except that the aqueous dispersion of Production Example (1) was used in lieu of the fluororesin-containing aqueous dispersion obtained in Production Example (2) and further that 11.8 g of deionized water was added in lieu of the 20% aqueous solution of polyoxyethylene tridecyl ether (HLB value=9.5).

The coating composition obtained had a PTFE solid content of 45.9%, a decomposable acrylic resin solid content of 10%, a nonionic surfactant (HLB=13.0) content corresponding to 8.0% of the PTFE solid content, and a PFOA content corresponding to 932 ppm of the PTFE solid content.

An about 100 ml-portion of the coating composition obtained was stirred at 300 rpm (40° C.) for 6 hours; no aggregates were formed and the mechanical stability was good.

Using the coating composition obtained, coated sheets for evaluation were prepared and evaluated in the same manner as in Example 1.

The evaluation results obtained in the above Example and Comparative Example are shown in Table 1.

TABLE 1

| | Ex. 1 | Comp. Ex. 1 |
|---|---|---|
| Polyoxyethylene tridecyl ether (HLB value = 9.5) content (corresponding to PTFE) | 0.5% | Nothing |
| Decomposable acrylic resin content (corresponding to PTFE) | 10% | 10% |
| PFOA content (corresponding to PTFE) | 90 ppm | 932 ppm |
| Evaluation result | ◯ | ◯ |

The above results revealed that the coating composition of Example 1 is excellent in coating performance, like the composition of Comparative Example 1 which has a high PFOA content.

INDUSTRIAL APPLICABILITY

The coating composition according to the invention, which has the constitution described hereinabove, is excellent in coating performance and can be used as a coating for providing various products with a coating film in spite of the fact that a fluorine-containing surfactant content therein is low.

The invention claimed is:

1. A coating composition which is an aqueous dispersion comprising, in an aqueous medium, a fluororesin particle (A) comprising a fluororesin, a resin particle (B) the decomposition and vaporization of which begin at a temperature not higher than a decomposition temperature of the fluororesin and a nonionic surfactant (C2) having an HLB value of not lower than 9.0 but not higher than 10.0 and represented by the general formula (II):

$$R^b\text{—O—A—H} \qquad (II)$$

wherein $R^b$ represents a straight or branched, saturated or unsaturated acyclic aliphatic hydrocarbon group containing 10 to 14 carbon atoms or a saturated cycloaliphatic hydrocarbon group containing 10 to 14 carbon atoms and A represents a polyoxyalkylene chain consisting of 3 to 6 oxyethylene groups and 0 to 3 oxypropylene groups, and wherein the aqueous dispersion contains the resin particle (B) in an amount of 7% to 15% by mass relative to the fluororesin particle (A), the nonionic surfactant (C2) in an amount of 0.1% to 3% by mass relative to the fluororesin particles (A) and a fluorine-containing surfactant in an amount smaller than 100 ppm relative to the fluororesin particle (A).

2. The coating composition according to claim 1, wherein the resin particle (B) is a depolymerizable acrylic resin particle.

3. The coating composition according to claim 1, wherein the fluororesin comprises at least one resin selected from the group consisting of polytetrafluoroethylene [PTFE], TFE/hexafluoropropylene [HFP] copolymers [FEP] and TFE/perfluoro(alkyl vinyl ether) [PAVE] copolymers [PFA].

4. The coating composition according to claim 1, wherein the fluorine-containing surfactant comprises a perfluorocarboxylic acid or a salt thereof.

5. A method of producing a coating composition, which comprises the step of admixing an aqueous dispersion comprising fluororesin particle (A) comprising a fluororesin, a nonionic surfactant (C1) having an HLB value exceeding 10.0 but not exceeding 16.0 and a fluorine-containing surfactant and having the fluorine-containing surfactant content lower than 100 ppm relative to the fluororesin particle (A), with a nonionic surfactant (C2) having an HLB value of not lower than 9.0 but not higher than 10.0 and represented by the general formula (II):

$$R^b\text{—O—A—H} \qquad (II)$$

wherein $R^b$ represents a straight or branched, saturated or unsaturated acyclic aliphatic hydrocarbon group containing 10 to 14 carbon atoms or a saturated cycloaliphatic hydrocarbon group containing 10 to 14 carbon atoms and A represents a polyoxyalkylene chain consisting of 3 to 6 oxyethylene groups and 0 to 3 oxypropylene groups, and and a resin particle (B) the decomposition and vaporization of which begin at a temperature not higher than the decomposition temperature of the fluororesin, wherein the aqueous dispersion contains the nonionic surfactant (C1) in an amount of 0.1% to 10% by mass relative to the fluororesin particle (A), wherein the nonionic surfactant (C2) is incorporated in an amount of 0.1 to 3% by mass relative to the fluororesin particular (A), and wherein the resin particle (B) is incorporated in an amount of 7% to 15% by mass relative to the fluororesin particle (A).

6. A coated article which is obtained by applying a coating composition according to claim 1.

7. A coated article which is obtained by applying a coating composition obtained by a coating composition production method according to claim 5.

8. The coating composition production method according to claim 5,
wherein the resin particle (B) is a depolymerizable acrylic resin particle.

9. The coating composition production method according to claim 5,
wherein the fluororesin comprises at least one resin selected from the group consisting of polytetrafluoroethylene [PTFE], TFE/hexafluoropropylene [HFP] copolymers [FEP] and TFE/perfluoro(alkyl vinyl ether) [PAVE] copolymers [PFA].

10. The coating composition production method according to claim 5,
wherein the fluorine-containing surfactant comprises a perfluorocarboxylic acid or a salt thereof.

* * * * *